April 2, 1968    C. A. WALTON    3,376,480
ANALOG STORAGE DEVICE
Filed Nov. 25, 1964

INVENTOR.
CHARLES A. WALTON
BY
ATTORNEY

United States Patent Office 3,376,480
Patented Apr. 2, 1968

3,376,480
ANALOG STORAGE DEVICE
Charles A. Walton, Los Gatos, Calif., assignor to International Business Machines Corporation, New York, N.Y., a corporation of New York
Filed Nov. 25, 1964, Ser. No. 413,748
17 Claims. (Cl. 317—123)

This invention relates generally to analog storage devices, and particularly to the application of such devices to pneumatic force balance transducers.

The transient nature of the electrical output signals from a computer presents a problem where the computer is used to control an industrial process. The actuators for valves and other process control devices usually require continuous signals, or at best a signal substantially longer than the computer signals. Furthermore, the pneumatic actuators which predominate in the industrial process control systems do not readily accept electrical control signals such as those from computers.

The storage device of my invention converts the transient electrical output signals from the computer to a remanent magnetic state in the control element. This element is continually sensed by a mechanical sensor such as a movable armature. In one embodiment a pneumatic force balance transducer has a command applied thereto by the magnetic force between an armature affixed to the balance beam and a pole piece control element having a remanent magnetic state set to the desired signal from the computer. The pole piece has a winding which may be energized with short duration computer signals to drive it to the desired remanent magnetic state. Either pulse type or analog signals may be used to set the remanent magnetism to the desired level after which the computer signal may be discontinued.

It is, therefore, an object of my invention to provide an improved analog signal storage device.

Another object of my invention is to provide means for storing an electrical signal and converting it to a pneumatic signal.

Still another object of my invention is to provide means for non-destructive sensing of a magnetic element having a remanent magnetic state which may be set to any desired level.

The foregoing and other objects, features and advantages will be apparent from the following more particular description of preferred embodiments of the invention as illustrated in the accompanying drawings.

Figures 1, 2:
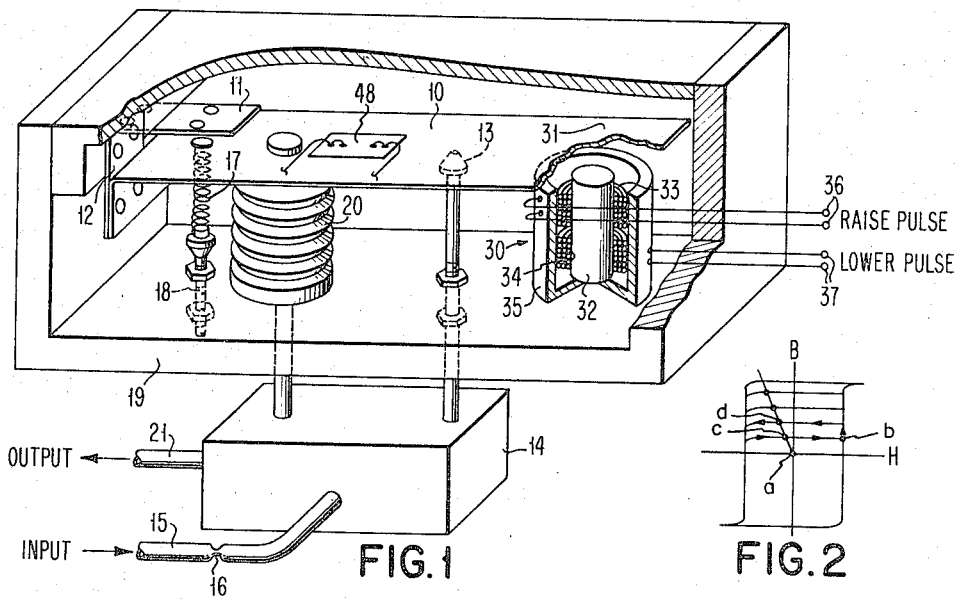
FIG. 1 is an isometric view, with parts cut away, of a pneumatic force balance transducer embodying the invention.
FIG. 2 is a B–4 curve of the control element.

The force balance transducer of FIG. 1 includes a movable beam 10 supported at one end by flexure pivot elements 11 and 12. The displacement sensor air nozzle 13, is supplied from a chamber 14 connected to an air source by means of supply line 15 which serves as a limited air supply having a restricted portion 16. One end of an adjustment spring 17 is connected to the beam 10, the other end of spring 17 is connected to an adjustment screw 18 having a threaded portion passing through the support member 19. Beam 10 is urged downwardly towards nozzle 13 by the action of spring 17. This tends to cut off the flow of air escaping from nozzle 13, which in turn raises the pressure within chamber 14. A first or feedback actuator, bellows 20, is also in communication with chamber 14. The resulting increased pressure therein causes bellows 20 to expand urging beam 10 upwardly away from the nozzle until balance is again achieved. The pressure within chamber 14, and, therefore, also at output line 21, is a measure of the force which urges beam 10 downwardly against nozzle 13.

Such force balance transducers are well known in the process industry, for example, being described in Industrial Instrumentation Fundamentals, McGraw-Hill Book Company, 1962, at chapter 10.

The signal to be stored and converted into a pneumatic output at line 21 must be first converted into a force acting on beam 10. In the embodiment shown, the force command is developed by the magnetic forces existing between the magnetic, or second, actuator 30 and the magnetic armature portion 31 of beam 10 which lies adjacent to magnetic pole piece 32. A pair of windings 33 and 34 positioned around pole piece 32 provide means for altering the remanent magnetism of the pole piece. The pole piece 32 and windings 33 and 34 are positioned within a shell 35 of soft magnetic material which decreases the reluctance of the magnetic circuit seen by pole piece 32.

If pole piece 32 is magnetized by the application of an electric current to terminals 36 associated with winding 33, or terminals 37 associated with winding 34, the force exerted on armature 31 by the pole piece 32 will be altered. Since pole piece 32 is made of a square loop permanent magnet material, each pulse applied to winding 33 or 34 will effect a change in the remanent magnetism of pole piece 32. This, in turn, causes a change in the attractive force exerted on the armature 31. The resulting change in force applied to beam 10 will change the space between nozzle 13 and beam 10 to increase or decrease the pressure in chamber 14 as the case may be. This change in pressure is translated into a corresponding force produced by bellows 20 to restore the beam to the reference position. The increased or decreased pressure in chamber 14 is communicated to the process by means of output line 21.

The nature of the remanent magnetism of pole piece 32 is illustrated in the hysteresis curve shown in FIG. 2. Square loop material is preferred for the pole piece 32, to improve the linearity of response. A primary requirement is that the pole piece be of a material having a high remanence characteristic such as Alnico V so that the permanent magnet operation is achieved.

As shown in the hysteresis curve of FIG. 2, the application of a sufficiently large current to terminal 36 or 37 will create a magnetic intensity H and change the flux density B. The magnitude of the change in flux density will be primarily dependent upon the duration for which this current is applied in the case of square loop materials. When the hysteresis curve is not square, the magnitude of the current may be also used to determine the change in flux density.

Assuming that the pole piece 32 is essentially de-magnetized and, therefore, lies at the point $a$, the application of a current to the raise winding 36 will cause the core to follow a path to point $b$. If the current is then discontinued, the remanent magnetism will rest at point $c$. It will be noted that point $c$ does not lie exactly on the vertical axis. This is due to the de-magnetizing effect of the air gap between pole piece 32, armature 31, and the shell 30. The remanent magnetic state of pole piece 32 will exert a proportional force on the armature 31 causing a corresponding output pressure at output line 21.

If it is desired to further change the output at output line 21, an additional current pulse may be applied to the raised terminal 36 causing the remanent magnetism to be altered to point $d$ of FIG. 2. Succeeding modifications in the remanent magnetism of pole piece 32 may be made as desired. It will be observed, however, that operation must be confined to the upper half of the hysteresis loop since a reversal of the effect of raise and lower pulses will be had if the device is allowed to pass into the lower half of the hysteresis loop. In order to prevent this occurrence, it is desirable that some form of bias be used to restrict the operating point to the upper half of the loop. This can be done by using a permanent magnet portion in armature 31, or a higher coercivity portion in the pole piece 32 which operates to bias the remanent magnetism in pole piece 32 to the upper half of the hysteresis curve.

In the event that the magnetic material of pole piece 32 is an ideal square loop material, the raise and lower pulses may be of equal currents which are applied to oppositely polarized windings 33 and 34 for certain predetermined intervals of time. The magnitude of the change in remanent magnetism will be a function of the time for which the current pulse is applied.

Figures 3, 4:
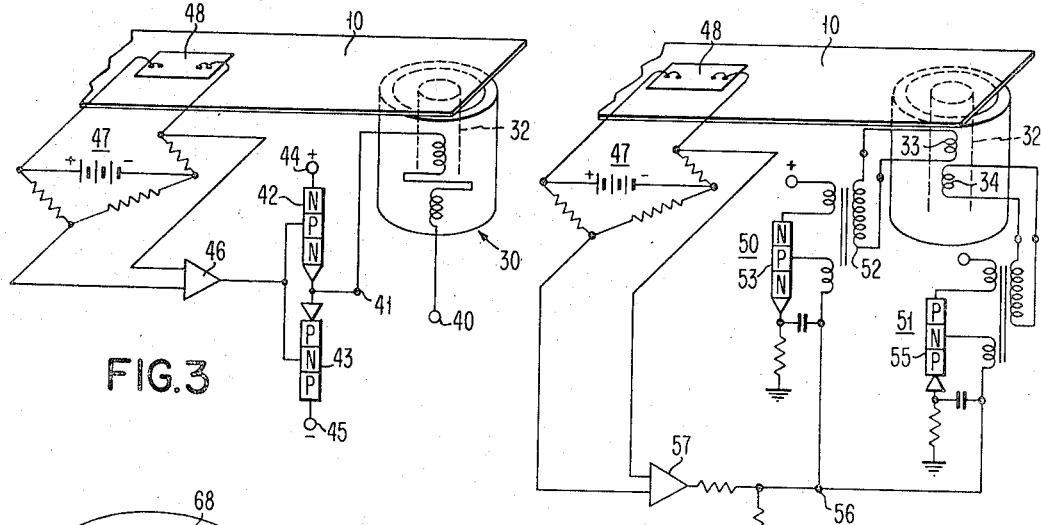
FIGS. 3 and 4 are details of the embodiments which show the application of feedback to alternative control circuits.

In the embodiment of FIG. 3 an alternative method for driving the raise and lower windings 33 and 34 is shown. The windings are connected in series and an analog command voltage is applied to terminal 40 through a low impedance source. Terminal 41, connected to the opposite end of the series connected windings, is coupled to the emitters of complementary transistors 42 and 43. The collectors of these transistors are connected to oppositely polarized sources by means of terminals 44 and 45. The base electrodes of transistors 42 and 43 are interconnected and driven from an amplifier 46. The amplifier has as its input the output of a strain gage bridge, shown generally as 47. The active element of the bridge, strain gage 48, is affixed to beam 10 in a manner to provide an output signal representative of the forces acting on the beam.

When a command voltage is applied to terminal 40, it operates to deflect beam 10 in a manner to provide a change in the resistance of strain gage 48. Strain gage 48 may be of the semiconductor type described in Semiconductor Strain Gages published by Academic Press, New York, 1942. This change in resistance is amplified in amplifier 46 and applied to the complementary emitter follower transistors 42 and 43. Any difference in voltage between terminal 41, the command voltage, and terminal 42, the output of the strain gage 48, is translated into a current from either source 44 or 45 tending to drive the pole piece 32 to a remanent magnetic state in which the force on the beam is exactly proportional to the command voltage. In this manner a linear operation may be achieved since the force exerted on the beam by the actuator 30 will be made exactly equal to the command voltage applied to terminal 40. When the attractive force is exactly equal to the command voltage, the circuit may be de-energized by disconnecting terminal 40 from the command voltage. The remanent magnetic state of pole piece 32 retains the command voltage in the form of remanent magnetism. The result is a continuous output pressure at line 21 proportional to the command voltage applied at terminal 40.

The device of FIG. 4 illustrates a further modification in the manner of applying command signals to the pole piece 32. The windings 33 and 34 are connected to the output windings of the blocking oscillators 50 and 51. Blocking oscillator 50 operates to generate a current pulse in winding 52 when the voltage applied to the base of transistor 53 reaches a predetermined positive level. The circuit operates in a conventional manner to develop output pulses in winding 52 as long as the voltage at the base of transistor 53 is above a minimum value. Blocking oscillator 51 operates in a similar manner to produce output pulses in winding 54 as long as the voltage at the base of transistor 55 is more negative than a predetermined value. Terminal 56, which determines the D.C. bias at the bases of transistors 53 and 55, is connected to the output of amplifier 57 and the command voltage terminal 58 by means of comparing (subtracting) resistors 59 and 60, respectively.

As discussed with reference to FIG. 3, the output of amplifier 57 is proportional to the output of strain gage 48. The voltage at terminal 56 will be at ground level when the amplifier output is equal and opposite in polarity to the command voltage applied to terminal 58. When terminal 56 is at the ground level, neither blocking oscillator 50 nor blocking oscillator 51 will be effective to produce current pulses to the windings about pole piece 32. However, when these voltages are not equal, one or the other will predominate at point 56 to cause either blocking oscillator 50 or 51 to produce current pulses to the windings about pole piece 32 and change the remanent magnetic state of the pole piece. The resulting remanent magnetism will exert a force on the beam 10 causing a change in the output of strain gage 48 in a manner to drive the system to equilibrium.

Figures 5, 6:
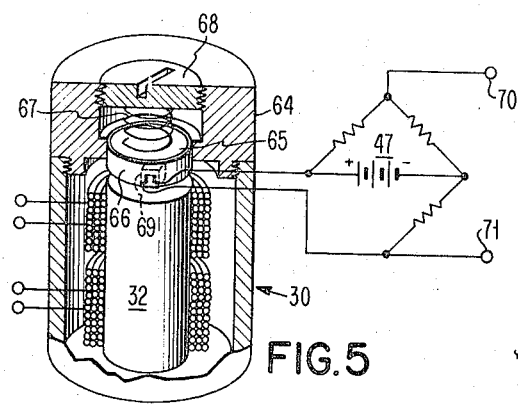
FIG. 5 is an isometric view, with parts cut away, of an embodiment having a pressure sensitive resistance element directly responsive to the magnetic force exerted on the armature.
FIG. 6 is a detailed view of the pressure sensitive element of FIG. 5.

The embodiment of FIG. 5 differs from those previously described in that a conventional force balance arrangement is not required. Instead, the actuator 30 has a magnetic plug 64 screwed into the top portion thereof. An armature portion 65, having a thin layer 66 of non-magnetic material such as copper to provide a gap between the armature 65 and cap 64, is slidably mounted in the cap 64 and biased downwardly by the action of spring 67 bearing against the armature 65 at one end and against adjustment screw 68 at the other. Between the armature portion 65 and pole piece 32 is a semiconductor pressure sensitive strain element 69.

The pressure on this strain element 69 is a function of the compression in spring 67 and the attraction between pole piece 32 and armature 65. Since the distortion of semiconductor strain element 69 is very small, the air gap between pole piece 32 and armature 65 remains essentially unchanged as was the case with the transducers previously discussed. Thus, the variable pressure exerted on semiconductor strain element 69 will be proportional to the remanent magnetism of pole piece 32. The semiconductor strain element 69 is the active element of bridge 47. The output of the bridge then becomes proportional to the changes in the resistance of semiconductor strain element 69 and appears across terminals 70 and 71.

FIG. 6 illustrates in detail the nature of semiconductor strain element 69. Ideally, this is a cube of N type silicon about .075" on a side used in the 100 direction with a pair of P type sensing elements diffused or grown in one face.

The devices which have been described are all operative to provide a continuous output signal which is proportional to a transient electrical signal which need be applied only long enough to allow the remanent magnetic state of a portion of the magnetic circuit to reach the desired level. In the case of the embodiment shown in FIG. 1, the application of pulses to the appropriate windings associated with the storage element is effective to retain a remanent magnetic state indicative of the desired signal level. The device of FIG. 3 operates to retain a stored magnetic signal proportional to a command voltage which need be applied only momentarily. Similarly, the device of FIG. 4 operates to produce a stored magnetic signal proportional to a command voltage. In the device of FIG. 5 an electrical output signal is provided instead of the pneumatic output of the previously described systems, but here too the transient electrical signal is stored in the remanent magnetic state of the pole piece 32. Since the remanent magnetic state of the pole piece 32 is essentially infinitely variable, any desired value of analog signal may be stored for an indefinite period.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a force balance transducer having a displacement sensor and feedback actuator cooperating with a beam, means for applying a force command to said beam comprising:
   a pole piece of magnetic material having a high remanence characteristic,
   means for altering the remanent magnetism of said pole piece in response to a command signal,
   an armature portion of said beam, and support means positioning said pole piece adjacent to and spaced from said armature portion to exert a force thereon proportional to the remanent magnetism of said pole piece.

2. A device according to claim 1 wherein said armature portion includes a high coercivity permanent magnet.

3. A device according to claim 1 wherein said means for altering the remanent magnetism comprises a winding about said pole piece and means for applying an electrical signal to the winding.

4. A device according to claim 1 wherein the force exerted on said armature portion is attractive.

5. In a force balance transducer, a movable beam, a displacement sensor positioned for coaction with said beam to provide an output signal proportional to the deviation of said beam from a reference position,
   a first actuator responsive to said output signal tending to restore said beam to said reference position,
   second actuator means for applying a force command to said beam comprising:
      a pole piece of magnetic material having a high remanence characteristic,
      a winding about said pole piece,
      means for applying an electrical signal to said winding to alter the remanent magnetism of said pole piece,
      and an armature of magnetic material affixed to said beam adjacent to and spaced from said pole piece to be attracted to said pole piece by a force proportional to the remanent magnetism.

6. A device according to claim 5 wherein said armature includes a high coercivity permanent magnet.

7. In a pneumatic force balance transducer having a nozzle and a feedback bellows cooperating with a beam, means for applying a force command to said beam comprising:
   a pole piece of magnetic material having a high remanence characteristic,
   a winding about said pole piece,
   means for applying an electrical signal to said winding to alter the residual flux density of said pole piece,
   an armature of magnetic material affixed to said beam,
   and support means for positioning said pole piece adjacent to and spaced from said armature to exert a force on said armature in a direction opposite to that of said feedback bellows.

8. A device according to claim 7 wherein said armature includes a high coercivity permanent magnet and the force between said armature and pole piece is attractive.

9. In a pneumatic force balance transducer, a movable beam, a displacement sensing nozzle adjacent said beam providing a signal proportional to the displacement of said beam from a reference position, a bellows energized by said nozzle signal to exert a restoring force on said beam,
   means for applying a force command to said beam in a direction to decrease the spacing between said nozzle and said beam comprising:
      a pole piece of magnetic material having a high remanence characteristic,
      a winding about said pole piece,
      means for applying an electrical signal to said winding to alter the remanent magnetism of said pole piece,
      said beam having an armature portion of magnetic material,
      and support means holding said pole piece adjacent to and spaced from said armature to exert a force on said armature in a direction opposite to that of said feedback bellows.

10. A device according to claim 9 wherein said armature includes a high coercivity permanent magnet and the force between said armature and pole piece is attractive.

11. In a pneumatic force balance transducer, a nozzle, a chamber having a limited supply of air connected to supply said nozzle, a movable beam adjacent said nozzle to regulate the flow of air therefrom and thereby control the pressure in said chamber, a feedback bellows energized according to the pressure in said chamber and positioned to exert a restoring force on said beam,
   means for applying a force command to said beam comprising:
      a pole piece of magnetic material having a high remanence characteristic,
      a winding about said pole piece,
      means for applying a current signal to said winding to alter the remanent magnetism of said pole piece,
      said beam having an armature portion of permanent magnetic material,
      and support means holding said pole piece adjacent to, and spaced from, said armature portion to exert a force thereupon in a direction opposite to that exerted by said feedback bellows.

12. Analog signal storage means for providing a continuous output signal representative of a discontinuous electrical input signal comprising:
   a pole piece of magnetic material having a high remanence characteristic,
   a winding about said pole piece,
   means for applying said input signal to said winding to alter the remanent magnetism of said pole piece,
   an armature of magnetic material adjacent to and spaced from said pole piece,
   and a semiconductor strain element mechanically linked to said armature to provide an output signal proportional to the magnetic force exerted on said armature by said pole piece.

13. Analog signal storage means for providing a continuous output signal representative of an electrical input signal comprising:
   a pole piece of magnetic material having a high remanence characteristic,
   a winding about said pole piece,
   means for applying said input signal to said winding to alter the remanent magnetism of said pole piece,
   an armature of magnetic material adjacent to and spaced from said pole piece,
   a semiconductor strain element positioned against said armature to provide an output signal proportional to the force exerted on said armature by the residual flux in said pole piece,
   pneumatic sensing means for providing a pressure output signal representing the deviation of said beam from a balanced reference position,
   and pneumatic actuating means responsive to said pressure signal to urge said beam in a direction tending to restore it to said reference position.

14. Analog signal storage means for providing a continuous output signal representative of an electrical input signal comprising:
   a pole piece of magnetic material having a high remanence characteristic,
   an armature of magnetic material adjacent to and spaced from said pole piece,
   a semiconductor strain element positioned against said armature to provide an output signal proportional to the force exerted on said armature by the remanent magnetism of said pole piece, means for comparing said input signal to said output signal, means responsive to said comparing means for altering the remanent magnetism of said pole piece, and pneumatic sensing and actuating means for restoring said beam to a predetermined position.

15. Analog signal storage means for providing a continuous output signal representative of an electrical input signal comprising:

a pole piece of magnetic material having a high remanence characteristic, an armature of magnetic material adjacent to and spaced from said pole piece, a semiconductor strain element positioned against said armature to provide an output signal proportional to the force exerted on said armature by the remanent magnetism of said pole piece, comparator means having an output representing the difference between said input signal and said output signal, a winding about said pole piece, and a current source responsive to said comparator output for applying a current signal to said winding to alter the remanent magnetism in a direction tending to reduce the difference between said input and output signal.

16. A device according to claim 15 wherein said current generating means comprises a first blocking oscillator responsive to an input signal greater than the output signal to provide output pulses to said winding polarized to increase the remanent magnetism of said pole piece, and a second blocking oscillator responsive to an output signal greater than the input signal to provide output pulses to said winding polarized to decrease the remanent magnetism of said pole piece.

17. Analog signal storage means for providing a continuous output signal representative of an electrical input signal comprising, a pole piece of magnetic material having a high remanence characteristic, an armature of magnetic material adjacent to and spaced from said pole piece, a semiconductor strain element positioned against said armature to provide an output signal proportional to the force exerted on said armature by the remanent magnetism of said pole piece, comparator means energized by said strain element output signal and said input signal to provide a second output signal representing the difference therebetween, and means for applying said second output signal to said winding.

References Cited

UNITED STATES PATENTS

| | | | |
|---|---|---|---|
| 2,375,017 | 9/1945 | Marrison | 335—253 X |
| 3,089,064 | 5/1963 | DeBennetot | 335—229 X |
| 3,102,931 | 9/1963 | Simmons et al. | 335—112 X |

MILTON O. HIRSHFIELD, *Primary Examiner.*

J. A. SILVERMAN, *Assistant Examiner.*